(12) United States Patent
Kim

(10) Patent No.: US 10,361,459 B2
(45) Date of Patent: Jul. 23, 2019

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: Samsung SDI Co., Ltd., Yongin-si, Gyeonggi-do (KR)

(72) Inventor: Seung-Mo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 398 days.

(21) Appl. No.: 14/035,912

(22) Filed: Sep. 24, 2013

(65) Prior Publication Data

US 2014/0342246 A1    Nov. 20, 2014

Related U.S. Application Data

(60) Provisional application No. 61/823,367, filed on May 14, 2013.

(51) Int. Cl.
*H01M 10/0569*    (2010.01)
*H01M 10/052*    (2010.01)
(Continued)

(52) U.S. Cl.
CPC ........ *H01M 10/0569* (2013.01); *C01G 53/50* (2013.01); *H01M 4/505* (2013.01);
(Continued)

(58) Field of Classification Search
CPC .............. C01G 53/50; H01M 10/052; H01M 10/0525; H01M 10/0569; H01M 2300/004; H01M 4/505; H01M 4/525; Y02E 60/122

See application file for complete search history.

(56) References Cited

U.S. PATENT DOCUMENTS 6,040,090 A    3/2000    Sunagawa et al.
7,604,897 B2    10/2009    Matsuno et al.
(Continued)

FOREIGN PATENT DOCUMENTS

CN    1612405 A    5/2005
CN    1667865 A    9/2005
(Continued)

OTHER PUBLICATIONS

EPO Search Report dated Sep. 1, 2014, for corresponding European Patent application 13187596.5, (7 pages).
(Continued)

*Primary Examiner* — Lingwen R Zeng
(74) *Attorney, Agent, or Firm* — Lewis Roca Rothgerber Christie LLP

(57) ABSTRACT

A rechargeable lithium battery includes a positive electrode including a positive active material, a negative electrode including a negative active material and an electrolyte including a lithium salt and a non-aqueous organic solvent, wherein the positive active material includes a nickel-based composite oxide represented by the following Chemical Formula 1, the non-aqueous organic solvent includes ethylene carbonate, and the ethylene carbonate is included in an amount of 7.5 to 27.5 volume % based on the total amount of the non-aqueous organic solvent, $$LiNi_xCo_yMn_zO_2 \quad \text{[Chemical Formula 1]}$$

wherein in Chemical Formula 1, $0.63 \leq x \leq 0.85$, $0.05 < y < 0.25$, $0.03 < z < 0.02$ and $x+y+z=1$.

8 Claims, 11 Drawing Sheets

(51) Int. Cl.
  *H01M 4/505* (2010.01)
  *H01M 4/525* (2010.01)
  *H01M 10/0525* (2010.01)
  *C01G 53/00* (2006.01)

(52) U.S. Cl.
  CPC ......... *H01M 4/525* (2013.01); *H01M 10/052* (2013.01); *H01M 10/0525* (2013.01); *H01M 2300/004* (2013.01)

(56) References Cited

U.S. PATENT DOCUMENTS

| | | |
|---|---|---|
| 8,415,057 B2 | 4/2013 | Oh et al. |
| 2005/0069775 A1 | 3/2005 | Hwang et al. |
| 2005/0084765 A1* | 4/2005 | Lee ................. H01M 4/366 429/329 |
| 2005/0100786 A1 | 5/2005 | Ryu et al. |
| 2005/0202316 A1* | 9/2005 | Hwang ............. C01G 53/50 429/231.1 |
| 2008/0220336 A1* | 9/2008 | Mun ................ H01M 10/0568 429/332 |
| 2010/0099018 A1 | 4/2010 | Kawase et al. |
| 2011/0101924 A1* | 5/2011 | Oh ................... H01M 4/364 320/162 |
| 2011/0111305 A1 | 5/2011 | Jeon et al. |

FOREIGN PATENT DOCUMENTS

| | | |
|---|---|---|
| CN | 102055019 A | 5/2011 |
| EP | 0 872 450 A1 | 10/1998 |
| EP | 1508934 A1 | 2/2005 |
| EP | 1 521 317 A2 | 4/2005 |
| JP | 10-289731 A | 10/1998 |
| JP | 2000-048820 | 2/2000 |
| JP | 2001-155739 A | 6/2001 |
| JP | 2005-72003 A | 3/2005 |
| JP | 2005-108810 A | 4/2005 |
| JP | 2005-259703 A | 9/2005 |
| JP | 2007-53116 A | 3/2007 |
| JP | 2007-73215 A | 3/2007 |
| JP | 2009-536437 A | 10/2009 |
| JP | 2010-90068 A | 4/2010 |
| JP | 2010-97756 A | 4/2010 |
| JP | 2010-192424 A | 9/2010 |
| JP | 2010-537369 A | 12/2010 |
| JP | 2011-96661 A | 5/2011 |
| JP | 2011-124086 A | 6/2011 |
| KR | 10-2005-0028895 A | 3/2005 |
| KR | 10-2009-0018003 | 2/2009 |
| KR | 10-2011-0047607 A | 5/2011 |

OTHER PUBLICATIONS

Patent Abstracts of Japan, and English machine translation of Japanese Publication 2000-048820 dated Feb. 18, 2000, listed above, (9 pages).
Patent Abstracts of Japan and Machine English Translation of JP 2010-192424 A, 51 Pages.
Patent Abstracts of Japan and Machine English Translation of JP 2011-124086 A, 28 Pages.
KIPO Office action dated Oct. 19, 2015, corresponding to Korean Patent application 10-2013-0137920, (5 pages).
Li, D., et al., *Synthesis and electrochemical properties of $LiNi_{0.85-x}Co_xMn_{0.15}O_2$ as cathode materials for lithium-ion batteries*, J Solid State Electrochem., Aug. 11, 2007, pp. 323-327.
EPO Office action dated Mar. 8, 2016, for corresponding European Patent application 13184596.5, (5 pages).
Wikipedia contributors, "1,2-Butylene carbonate," *Wikipedia, The Free Encyclopedia*, Mar. 21, 2013. Retrieved from the Internet: URL:https://en.wikipedia.org/w/index.php?title=1,2-Butylene_carbonate&oldid=545823811 [retrieved on Oct. 21, 2016].
EPO Office Action dated Oct. 28, 2016, for corresponding European Patent Application No. 13187596.5 (8 pages).
SIPO Office action dated Aug. 1, 2017 for Chinese Patent Application No. 201410113729.X, 7 pages.
JPO Office Action dated Nov. 7, 2017, for corresponding Japanese Patent Application No. 2014-028807 (4 pages).
EPO Office Action dated Sep. 5, 2017, for corresponding European Patent Application No. 13187596.5 (8 pages).
Japanese Office action dated May 8, 2018, for corresponding Japanese Patent Application No. 2014-028807 (4 pages).
Chinese Office Action, with English translation, dated Nov. 23, 2018, for corresponding Chinese Patent Application No. 201410113729.X (13 pages).

* cited by examiner

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of U.S. Provisional Application No. 61/823,367, filed on May 14, 2013 in the U.S. Patent and Trademark Office, the entire content of which is incorporated herein by reference.

BACKGROUND

1. Field

The present disclosure relates to a positive active material for a rechargeable lithium battery, a method of preparing the same, and a rechargeable lithium battery including the same.

2. Description of the Related Art

Lithium rechargeable batteries have recently drawn attention as a power source for small portable electronic devices. The lithium rechargeable batteries use an organic electrolyte solution and thereby, have a higher discharge voltage (e.g. twice as high) compared to a conventional battery using an aqueous alkali solution and accordingly, lithium rechargeable batteries have a higher energy density.

These rechargeable lithium batteries are used by injecting an electrolyte into a battery cell including a positive electrode, which includes a positive active material that can intercalate and deintercalate lithium, and a negative electrode, which includes a negative active material that can intercalate and deintercalate lithium.

As for the positive active material, $LiCoO_2$ has been widely used but has a problem of capacity limitations and safety. Accordingly, development of an alternative material is actively being researched.

Since $LiCoO_2$ has stable electrochemical characteristics, $LiNiO_2$ has high-capacity, and $LiMnO_2$ has good thermal stability and low cost, research on a Co—Ni—Mn three component-based lithium metal composite oxide (herein also referred to as "NCM" or "NCM composite oxide") is made to combine these features.

The NCM has different characteristics depending on a composition ratio among Co, Ni, and Mn. For example, when Mn is included in a higher ratio, safety is improved, when Co is included in a higher ratio, an output characteristic is improved, and when Ni is included in a higher ratio, a capacity characteristic is improved.

Recently, a positive active material having high specific capacity in a rechargeable lithium battery for xEv for increasing energy density per unit weight and thus, increasing mileage, has drawn attention.

Accordingly, active research has been made on a Ni-rich positive electrode material prepared by including Ni in a higher content in a NCM, for example, NCM111 (30% of Ni) having a specific capacity of 150 mAh/g, NCM523 (50% of Ni) having a specific capacity of 160 mAh, NCM622 (60% of Ni) having a specific capacity of 170 mAh/g, NCM75105 (75% of Ni) having a specific capacity of 180 mAh/g, and NCM85105 (85% of Ni) having a specific capacity of 190 mAh/g. In other words, it can be seen that as a NCM includes Ni in a higher ratio, specific capacity of the active material is increased. However, when an active material includes Ni in a higher content, air in a firing (heat treatment) atmosphere should be controlled, which brings about a problem of increasing a manufacturing cost, and may lead to a content of remaining lithium such as $Li_2CO_3$ and the like. This remaining lithium may generate gas, and the generated gas may increase resistance of a battery and deteriorate its cycle-life. Additionally, when Ni is included in a higher content, cation mixing occurs and leads to increased capacity deterioration of a battery in terms of the structure of the active material. The ICP analysis of a negative electrode and an electrolyte in such a deteriorated battery cell shows severe elution of Ni. Accordingly, an electrolyte capable of decreasing of gas generation and controlling deterioration of cycle-life caused by the Ni-rich high-capacity positive active material is desired.

SUMMARY

Aspects of embodiments of the present invention are directed toward a rechargeable lithium battery having desired cycle-life characteristics at high temperature, when a NCM positive active material having high-capacity and including nickel in a high content is used for a positive electrode.

In an embodiment, a rechargeable lithium battery is provided. The rechargeable lithium battery includes a positive electrode and the positive electrode including a positive active material including a nickel-cobalt-manganese (NCM) composite oxide. The nickel-cobalt-manganese (NCM) composite oxide includes nickel in an amount of greater than or equal to 63 atomic % based on a total amount of nickel cobalt and manganese in the nickel-cobalt-manganese (NCM) composite oxide. The rechargeable lithium battery includes an electrolyte including a lithium salt and a non-aqueous organic solvent. The non-aqueous organic solvent includes ethylene carbonate in an amount of between 7.5 to 27.5 volume % based on a total amount of the non-aqueous organic solvent.

In one embodiment, the nickel-cobalt-manganese (NCM) composite oxide includes nickel in an amount of greater than or equal to 63 atomic % and less than or equal to 85 atomic % based on the total amount of nickel cobalt and manganese in the nickel-cobalt-manganese (NCM) composite oxide.

In one embodiment, the nickel-cobalt-manganese (NCM) composite oxide is represented by the following Chemical Formula 1, $$LiNi_xCo_yMn_zO_2;$$ [Chemical Formula 1]

wherein in Chemical Formula 1, 0.63≤x≤0.85, 0.05<y<0.25, 0.03<z<0.02 and x+y+z=1.

In one embodiment, in Chemical Formula 1, x:y:z is 0.65:0.20:0.15.

In one embodiment, in Chemical Formula 1, x:y:z is 0.75:0.10:0.15.

In one embodiment, in Chemical Formula 1, x:y:z is 0.85:0.10:0.05.

In one embodiment, the nickel-cobalt-manganese (NCM) composite oxide is represented by the following Chemical Formula 1, $$LiNi_xCo_yMn_zO_2;$$ [Chemical Formula 1]

wherein 0.65≤x≤0.85, 0.1≤y≤0.2, 0.05≤z≤0.15, and x+y+z=1.

In one embodiment, the ethylene carbonate in an amount of greater than or 10 to less than or 25 volume % based on the total amount of the non-aqueous organic solvent.

In one embodiment, the non-aqueous organic solvent includes at least one of dimethyl carbonate (DMC), diethyl carbonate (DEC), dipropyl carbonate (DPC), methylpropyl carbonate (MPC), ethylpropyl carbonate (EPC), methylethyl carbonate (MEC), propylene carbonate (PC), and butylene carbonate (BC).

In one embodiment, the nickel-cobalt-manganese (NCM) composite oxide has a specific capacity of 170 mAh/g or greater.

In one embodiment, the nickel-cobalt-manganese (NCM) composite oxide has a specific capacity of 180 mAh/g or greater.

In one embodiment, the nickel-cobalt-manganese (NCM) composite oxide has a specific capacity of 190 mAh/g or greater.

According to aspects of embodiments of the present invention, a NCM positive active material having a high-capacity and including nickel in a high content (Ni-rich) is used for a positive electrode and thus, decreases gas generation in a rechargeable lithium battery including the same, and provides the rechargeable lithium battery with improved cycle-life characteristics at a high temperature.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
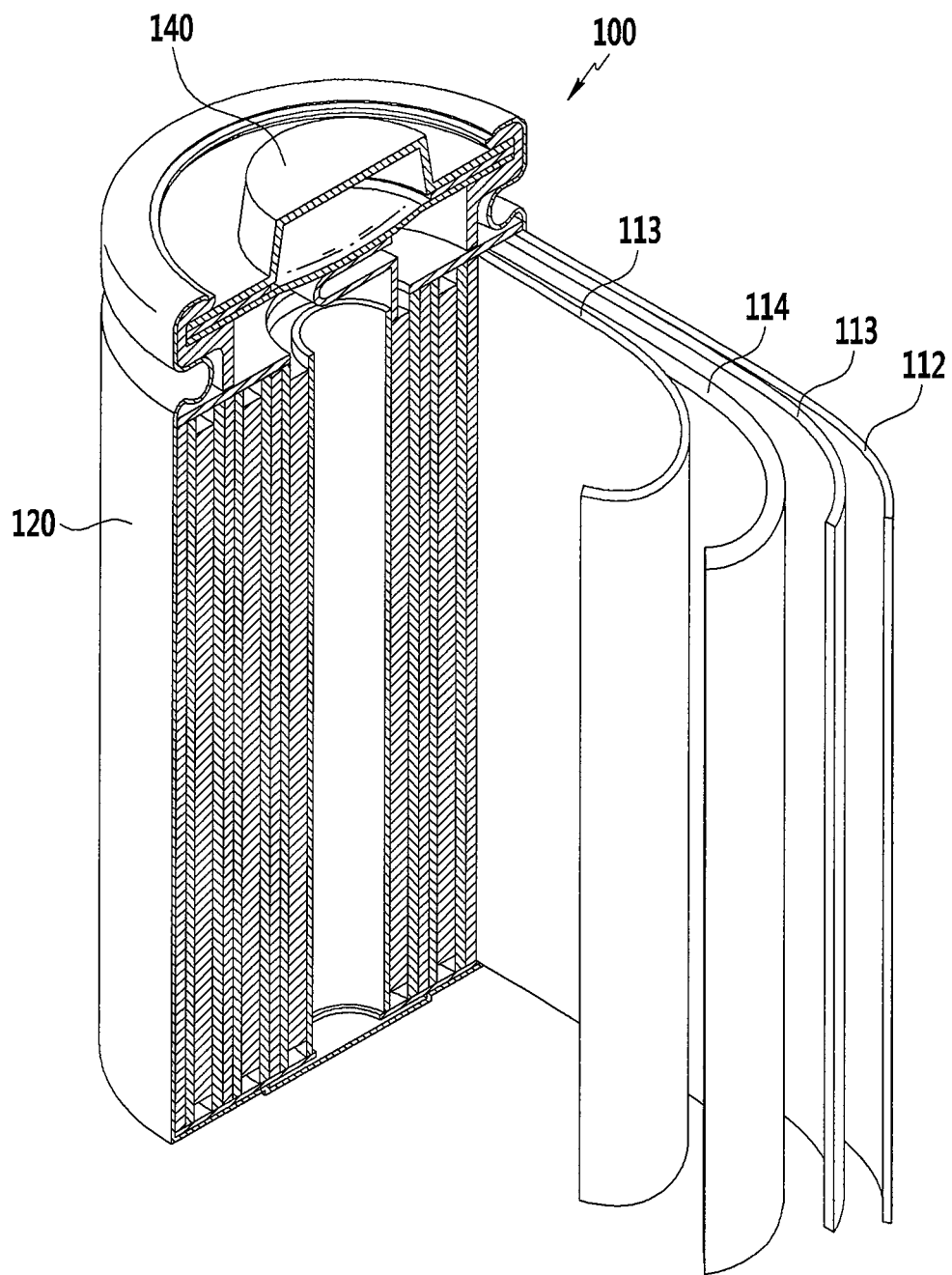
FIG. 1 is a schematic view showing a rechargeable lithium battery according to one embodiment.

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. The use of "may" when describing embodiments of the present invention refers to "one or more embodiments of the present invention". Expressions such as "at least one of," when preceding a list of elements, modify the entire list of elements and do not modify the individual elements of the list. Like reference numerals designate like elements throughout the specification.

Figure 2:
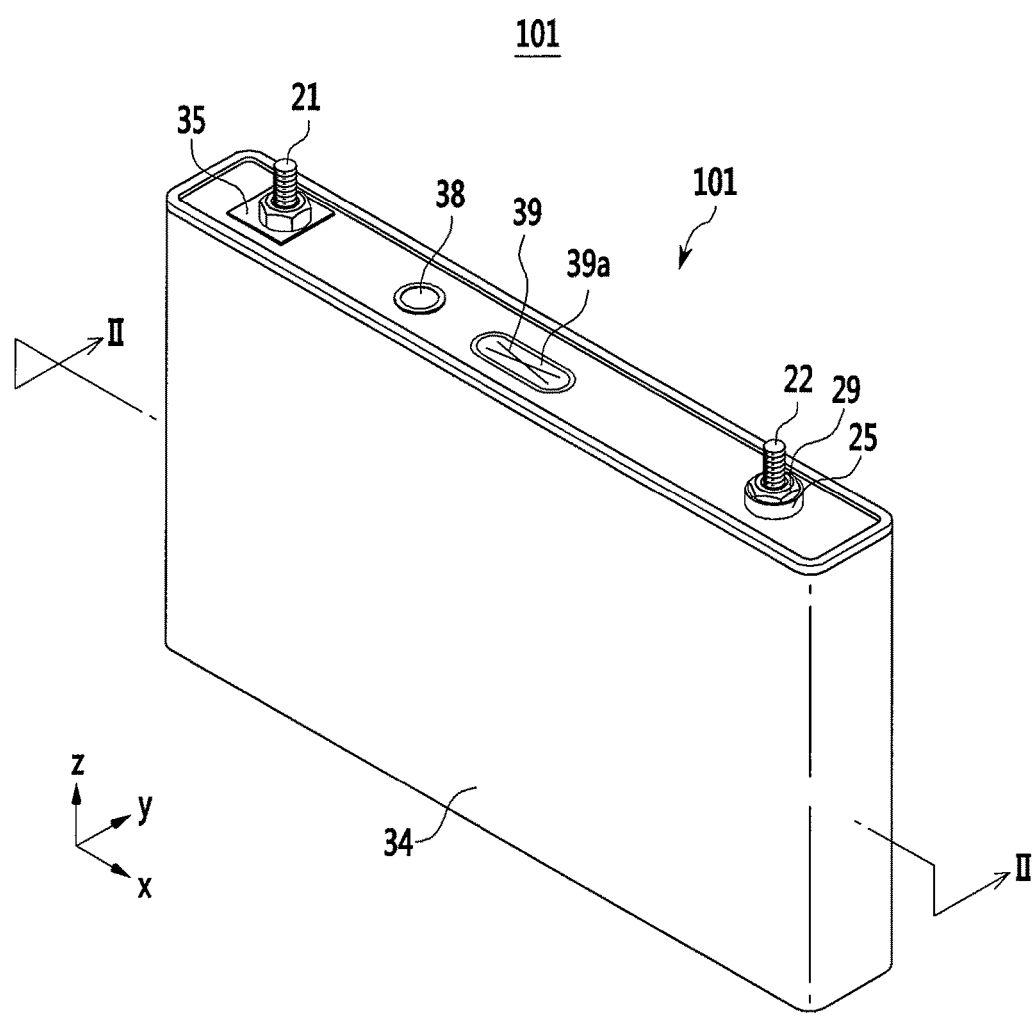
FIG. 2 is a schematic view showing a Plug-in Hybrid Electric Vehicle (PHEV) prismatic cell according to one embodiment.

A rechargeable lithium battery according to one embodiment is described by referring to FIG. 1 and FIG. 2.

FIG. 1 is a schematic view showing a rechargeable lithium battery according to one embodiment.

Referring to FIG. 1, the rechargeable lithium battery 100 according to one embodiment includes an electrode assembly including a positive electrode 114; a negative electrode 112 on the positive electrode 114; a separator 113 between the positive electrode 114 and negative electrode 112; and an electrolyte impregnated in the positive electrode 114, the negative electrode 112, and the separator 113; a battery case 120 including the electrode assembly; and a sealing member 140 sealing the battery case 120.

In one embodiment, the positive electrode 114 includes a current collector and a positive active material layer formed on the current collector. In one embodiment, the positive active material layer includes a positive active material and a binder. In one embodiment, the positive active material layer further includes a conductive material.

The current collector may be made of Al but is not limited thereto.

FIG. 2 is a schematic view showing a PHEV prismatic battery cell according to one embodiment.

In one embodiment, a positive active material includes a nickel-cobalt-manganese (NCM) composite oxide including nickel in an amount of greater than or equal to 63 atomic % based on a total amount of nickel cobalt and manganese in the nickel-cobalt-manganese (NCM) composite oxide. In one embodiment, the nickel-cobalt-manganese (NCM) composite oxide includes nickel in an amount of greater than or equal to 63 atomic % and less than or equal to 85 atomic % based on the total amount of nickel cobalt and manganese in the nickel-cobalt-manganese (NCM) composite oxide. In one embodiment, the positive active material includes a nickel-cobalt-manganese (NCM) composite oxide represented by the following Chemical Formula 1:

  [Chemical Formula 1]

In one embodiment, in the above Chemical Formula 1, $0.63 \leq x \leq 0.85$, $0.05 < y < 0.25$, $0.03 < z < 0.2$, and $x+y+z=1$. In one embodiment, in Chemical Formula 1, x:y:z is 0.65:0.20:0.15. In one embodiment, in Chemical Formula 1, x:y:z is 0.75:0.10:0.15. In one embodiment, in Chemical Formula 1, x:y:z is 0.85:0.10:0.05. In one embodiment, in Chemical Formula 1, $0.65 \times 0.85$. In one embodiment, in Chemical Formula 1, $0.65x \leq 0.85$, $0.1 \leq y \leq 0.2$, $0.05 \leq z \leq 0.15$, and $x+y+z=1$.

When nickel is included within these ranges, the active material may have a specific capacity of greater than or equal to 170 mAh/g. An active material having such high specific capacity may be used to manufacture a battery having low current density and thus, improved cycle-life characteristics, output characteristics, rate capability, and/or the like. When nickel is included in an amount outside of these ranges (e.g. less than 63%), the active material may have a specific capacity of less than 170 mAh/g and thus, may have decreased cycle-life characteristics, output characteristics, rate capability, and/or the like. In addition, when the NCM includes nickel in an amount of greater than or equal to 85%, an amount of lithium remaining in a battery may be increased and thus may generate more gas and deteriorate its thermal stability.

According to some embodiments, as more nickel is included in the nickel-based NCM composite oxide included in the positive active material of a rechargeable lithium battery, capacity of the battery may be improved. For example, a Co—Ni—Mn three component-based oxide including 63% of Ni may provide a capacity of greater than or equal to 170 mAh/g, a Co—Ni—Mn three component-based oxide including 70% of Ni may provide a capacity of greater than or equal to 180 mAh/g, and a Co—Ni—Mn three component-based oxide including 80% of Ni may provide a capacity of greater than or equal to 190 mAh/g.

In the above Chemical Formula 1, a Co—Ni—Mn three component-based oxide having x of greater than 0.63 may provide a rechargeable lithium battery having capacity even higher than that of a rechargeable lithium battery including 63% of Ni. Examples of high-capacity nickel-based NCM composite oxides according to some embodiments include $LiNi_{65}CO_{20}Mn_{15}$, $LiNi_{75}CO_{10}Mn_{15}$, and $LiNi_{85}CO_{10}Mn_{5}$.

In some embodiments, the binder improves binding properties of the positive active material particles to each other and to a current collector. Examples of the binder include polyvinylalcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, epoxy resin, nylon, and the like, but are not limited thereto.

In some embodiments, the conductive material improves electrical conductivity of a negative electrode. Any suitably electrically conductive material which does not cause a chemical change can be used. Examples of the conductive material include one or more of natural graphite; artificial graphite; carbon black; acetylene black; ketjen black; a carbon fiber; a metal powder or a metal fiber of copper, nickel, aluminum, silver, or the like; a polyphenylene derivative; and the like.

The electrolyte may include a non-aqueous organic solvent and a lithium salt.

The non-aqueous organic solvent transfers ions involved in the electrochemical reaction of a rechargeable lithium battery. The non-aqueous organic solvent may include a carbonate-based, an ester-based, an ether-based, a ketone-based, an alcohol-based, or an aprotic solvent.

The non-aqueous organic solvent according to one embodiment includes ethylene carbonate.

In one embodiment, the ethylene carbonate is included in an amount of between 7.5 to 27.5 volume % based on a total amount of the non-aqueous organic solvent. In one embodiment, the ethylene carbonate is included in an amount of greater than or 10 to less than or 25 volume % based on the total amount of the non-aqueous organic solvent. In some embodiments, the ethylene carbonate is included in an amount of 10 volume %, 15 volume %, 20 volume %, or 25 volume %, based on the total amount of the non-aqueous organic solvent.

When the ethylene carbonate is included within these ranges, deterioration of a battery may be reduced, and thus, stability of the battery may be improved.

The non-aqueous organic solvent may further include dimethyl carbonate (DMC), diethyl carbonate (DEC), dipropyl carbonate (DPC), methylpropyl carbonate (MPC), ethylpropyl carbonate (EPC), methylethyl carbonate (MEC), propylene carbonate (PC), butylene carbonate (BC), or a combination thereof. An electrolyte including a mixture of organic solvents may provide improved thermal safety, improved high temperature cycle life characteristics, and a high-capacity to a rechargeable lithium battery including the electrolyte.

The ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, or the like. The ether solvent may be, for example dibutylether, tetraglyme, diglyme, dimethoxyethane, 2-methyltetrahydrofuran, tetrahydrofuran, or the like. The ketone based solvent may be cyclohexanone, or the like. The alcohol-based solvent may be ethanol, isopropyl alcohol, or the like.

The non-aqueous organic solvent may be used singularly or in a mixture. When the organic solvent is used in a mixture, its mixture ratio can be selected in accordance with desired performance of a battery.

According to some embodiments, the lithium salt is dissolved in the non-aqueous solvent and supplies lithium ions to operate the rechargeable lithium battery and improve lithium ion transfer between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are non-zero natural numbers), LiCl, LiI, $LiB(C_2O_4)_2$ (lithium bis(oxalato) borate, LiBOB), and a combination thereof.

The lithium salt may be used in a concentration of about 0.1M to about 2.0M. When the lithium salt is included within the above concentration range, an electrolyte conductivity and viscosity suitable to improve electrolyte performance and lithium ion mobility may be provided.

In one embodiment, the negative electrode 112 includes a negative current collector and a negative active material layer formed on the negative current collector.

The negative current collector may be a copper foil but is not limited thereto.

In one embodiment, the negative active material layer includes a negative active material and a binder. In one embodiment, the negative active material layer further includes a conductive material.

In one embodiment, the negative active material includes a material that reversibly intercalates/deintercalates lithium ions, a lithium metal, a lithium metal alloy, a material being capable of doping lithium, or a transition metal oxide.

The material that reversibly intercalates/deintercalates lithium ions includes carbon materials. The carbon material may be any carbon-based negative active material suitable for use in a lithium ion secondary battery. Examples of the carbon material include crystalline carbon, amorphous carbon, and a combination thereof. The crystalline carbon may be non-shaped, sheet, flake, spherical, or fiber shaped natural or artificial graphite. The amorphous carbon may be a soft carbon (carbon obtained by sintering at a low temperature), a hard carbon, a mesophase pitch carbonized product, fired coke, or the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may include Si, $SiO_x$ (0<x<2), a Si—C composite, a Si-Q alloy (wherein Q is an alkali metal, an alkaline-earth metal, a Group 13 to 16 element (excluding Si), a transition element, a rare earth element, or a combination thereof), Sn, $SnO_2$, a Sn—C composite, an Sn—R alloy (wherein R is an alkali metal, an alkaline-earth metal, a Group 13 to 16 element (excluding Sn), a transition element, a rare earth element, or a combination thereof), or the like. At least one of the materials capable of doping and dedoping lithium may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, or the like.

In some embodiments, the binder improves binding properties of the negative active material particles to each other and to a current collector. Examples of the binder include polyvinylalcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material improves electrical conductivity of a negative electrode. Any suitably electrically conductive material which does not cause a chemical change can be used. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, or the like; a conductive polymer such as a polyphenylene; and a mixture thereof.

The negative electrode 112 and positive electrode 114 may be manufactured by mixing a respective active material, conductive material, and binder in a solvent, and coating the resulting composition on a respective current collector.

The electrode manufacturing method according to embodiments of the present invention includes any method suitable to manufacture an electrode for a rechargeable lithium battery, and thus is not described in more detail in the present specification. The solvent may include N-methylpyrrolidone or the like, but is not limited thereto.

The separator 113 may include any material suitable for separating a negative electrode 112 from a positive electrode 114 and providing a transporting passage for lithium ions in a rechargeable lithium battery. In other words, the separator 113 may be made of a material having a low resistance to ion transportation and an improved impregnation for an electrolyte. For example, the material may be selected from fiberglass, polyester, TEFLON, polyethylene, polypropylene, polytetrafluoroethylene (PTFE), and a combination thereof. The material may have a form of a non-woven fabric or a woven fabric. For example, a polyolefin-based polymer separator such as polyethylene, polypropylene or the like may be used. In order to provide suitable heat resistance and/or mechanical strength, a coated separator including a ceramic component or a polymer material may be used. The separator may have a mono-layered or multi-layered structure.

Hereinafter, the embodiments of the present invention are illustrated in more detail with reference to the following examples. However, the following are examples are not intended to limit the scope of the present invention.

Furthermore, what is not explicitly described herein should be understood by and apparent to those of ordinary skill in the art.

Preparation of Electrolyte

ELECTROLYTE EXAMPLES 1 TO 8 AND COMPARATIVE ELECTROLYTE EXAMPLES 1 TO 6

Each electrolyte according to Electrolyte Examples 1 to 8 and Comparative Electrolyte Examples 1 to 6 had a solvent composition as provided in the following Table 1.

TABLE 1

|  | EC (vol. %) | DMC (vol. %) | EMC (vol. %) |
|---|---|---|---|
| Electrolyte Example 1 | 10 | 0 | 90 |
| Electrolyte Example 2 | 10 | 90 | 0 |
| Electrolyte Example 3 | 10 | 45 | 45 |
| Electrolyte Example 4 | 25 | 0 | 75 |
| Electrolyte Example 5 | 25 | 75 | 0 |
| Electrolyte Example 6 | 25 | 37.5 | 37.5 |
| Electrolyte Example 7 | 17.5 | 18.8 | 63.8 |
| Electrolyte Example 8 | 17.5 | 63.8 | 18.8 |
| Comparative Electrolyte Example 1 | 40 | 0 | 60 |
| Comparative Electrolyte Example 2 | 40 | 60 | 0 |
| Comparative Electrolyte Example 3 | 40 | 30 | 30 |
| Comparative Electrolyte Example 4 | 32.5 | 18.8 | 48.8 |
| Comparative Electrolyte Example 5 | 32.5 | 48.8 | 18.8 |
| Comparative Electrolyte Example 6 | 30 | 40 | 30 |

ELECTROLYTE EXAMPLES 9 TO 18 AND COMPARATIVE ELECTROLYTE EXAMPLES 7 TO 9

Each electrolyte according to Electrolyte Examples 9 to 18 and Comparative Electrolyte Examples 7 to 9 had a solvent composition as provided in the following Table 2.

TABLE 2

|  | EC (vol. %) | EMC (vol. %) | DMC (vol. %) |
|---|---|---|---|
| Electrolyte Example 9 | 10 | 0 | 90 |
| Electrolyte Example 10 | 10 | 90 | 0 |

TABLE 2-continued

| | EC (vol. %) | EMC (vol. %) | DMC (vol. %) |
|---|---|---|---|
| Electrolyte Example 11 | 10 | 45 | 45 |
| Electrolyte Example 12 | 20 | 0 | 80 |
| Electrolyte Example 13 | 20 | 80 | 0 |
| Electrolyte Example 14 | 20 | 40 | 40 |
| Electrolyte Example 15 | 15 | 20 | 65 |
| Electrolyte Example 16 | 25 | 20 | 55 |
| Electrolyte Example 17 | 15 | 65 | 20 |
| Electrolyte Example 18 | 25 | 55 | 20 |
| Comparative Electrolyte Example 7 | 30 | 0 | 70 |
| Comparative Electrolyte Example 8 | 30 | 35 | 35 |
| Comparative Electrolyte Example 9 | 30 | 40 | 30 |

COMPARATIVE ELECTROLYTE EXAMPLES 10 TO 12

Each electrolyte according to Comparative Electrolyte Examples 11 to 13 had a solvent composition as provided in the following Table 3.

TABLE 3

| | EC (vol. %) | EMC (vol. %) | DMC (vol. %) |
|---|---|---|---|
| Comparative Electrolyte Example 10 | 10 | 45 | 45 |
| Comparative Electrolyte Example 11 | 20 | 40 | 40 |
| Comparative Electrolyte Example 12 | 30 | 40 | 30 |

ELECTROLYTE EXAMPLE 19 AND COMPARATIVE ELECTROLYTE EXAMPLE 13

Each electrolyte according to Electrolyte Examples 19 and Comparative Electrolyte Example 13 had a solvent composition as provided in the following Table 4.

TABLE 4

| | EC (vol. %) | EMC (vol. %) | DMC (vol. %) |
|---|---|---|---|
| Electrolyte Example 19 | 10 | 45 | 45 |
| Comparative Electrolyte Example 13 | 30 | 40 | 30 |

In Tables 1-4, EC refers to ethylene carbonate, DMC refers to dimethyl carbonate, and EMC refers to ethyl methyl carbonate. Each electrolyte according to Electrolyte Examples 1 to 19 and Comparative Electrolyte Examples 1 to 13 included 1.3M $LiPF_6$ and no additive.

Manufacture of Rechargeable Lithium Battery Cell

EXAMPLES 1 TO 8 AND COMPARATIVE EXAMPLES 1 TO 6

These Examples each included 75% of Ni.

NCM having a composition ratio of $LiNi_{75}Co_{10}Mn_{16}$ was used as a positive active material (made by Toda Material Corp).

The positive active material was mixed with polyvinylidene fluoride (PVDF) and denkablack in a weight ratio of 92:4:4 in N-methylpyrrolidone as a solvent, thus preparing positive active material slurry. The positive active material slurry was uniformly coated on a 12 μm-thick aluminum current collector and then, dried and compressed, thus fabricating a positive electrode.

A negative active material slurry was prepared by mixing artificial graphite as a negative active material, a binder, and a thickener in a weight ratio of 97.5:1.5:1 in a water solvent. The negative active material slurry was coated on a copper current collector and then, dried and compressed, thus fabricating a negative electrode.

The positive and negative electrodes, each electrolyte according to Electrolyte Examples 1 to 8 and Comparative Electrolyte Examples 1 to 6, and a separator of polypropylene/polyethylene/polypropylene were used to manufacture rechargeable lithium battery cells according to Examples 1 to 8 and Comparative Examples 1 to 6, respectively, each having a capacity of 230 mAh and a 18650 battery size.

EXAMPLES 9 TO 18 AND COMPARATIVE EXAMPLES 7 TO 9

These Examples each included 65% of Ni.

A positive active material was prepared as follows.

(Preparation of Positive Active Material)

$NiSO_4$, $CoSO_4$, and $MnSO_4$ powder were respectively mixed in a mole ratio of 65:20:15 to prepare a 2.4M aqueous solution, and a 7.5M NaOH aqueous solution and a 15M $NH_4OH$ aqueous solution were added thereto and consecutively mixed in a co-precipitator. The mixture was co-precipitated for 8 hours at a pH 11-12.5, a temperature of 40° C., and a speed of 700 rpm, thus obtaining a $(Ni_{0.65}CO_{0.20}Mn_{0.15})OH_2$ precursor. The precursor was washed, dried in a 120° C. oven, filtered, and then, mixed with $Li_2CO_3$ in a mole ratio of about 1:1 with a hand mixer. The obtained mixture was put in a firing container and fired at a speed of 2° C./min at a temperature of 750-900° C. for about 10 hours, thus preparing a nickel-based composite oxide, $LiNi_{0.65}Co_{0.20}Mn_{0.15}O_2$, as a positive active material.

Then, rechargeable lithium battery cells according to Examples 9 to 18 and Comparative Examples 7 to 9 were manufactured according to the same method as Examples 1 to 8 and Comparative Examples 1 to 6 except that each used an electrolyte according to Electrolyte Examples 9 to 18 and Comparative Electrolyte Examples 7 to 9, respectively.

COMPARATIVE EXAMPLES 10 TO 12

These examples each included 60% of Ni.

Rechargeable lithium battery cells according to Comparative Examples 10 to 12 were manufactured according to the same method as Examples 1 to 8 and Comparative Examples 1 to 6 except that a NCM having a composition ratio of $Ni_{60}Co_{20}Mn_{20}$ (made by Umicore Corp.) was used as a positive active material, and that each used an electrolyte according to Comparative Electrolyte Examples 10 to 12.

EXAMPLE 19 AND COMPARATIVE EXAMPLE 13

These examples each included 85% of Ni.

Rechargeable lithium battery cells according to Example 19 and Comparative Example 13 were manufactured according to the same method as Examples 1 to 8 and Comparative Examples 1 to 6 except that a NCM having a composition ratio of $Ni_{85}Co_{10}Mn_5$ (made by Ecopro Corp.) was used as a positive active material, and that each used an electrolyte according to Electrolyte Example 19 and Comparative Electrolyte Example 13, respectively.

Evaluation 1: 45° C. Cycle-Life Characteristic Evaluation Depending on Solvent Composition Each rechargeable lithium battery cell according to Examples 1 to 19 and Comparative Examples 1 to 13 were charged and discharged at 45° C. under a condition of 1C/1C condition. After 300 times of repeating this charge and discharge, capacity retention of the rechargeable lithium battery cells was measured depending on a cycle at a high temperature to evaluate cycle-life characteristic, and the results are provided in the following Tables 5 to 7 and FIGS. 3 to 6.

EXAMPLES 1 TO 8 AND COMPARATIVE EXAMPLES 1 TO 5

The rechargeable lithium battery cells according to Examples 1 to 8 and Comparative Examples 1 to 5 were evaluated regarding 45° C. cycle-life characteristics, and the results are provided in the following Table 5 and FIGS. 3 to 6.

TABLE 5

| | 45° C. cycle capacity retention (%) |
|---|---|
| Example 1 | 86.31 |
| Example 2 | 88.66 |
| Example 3 | 90.19 |
| Example 4 | 89.59 |
| Example 5 | 88.93 |
| Example 6 | 86.29 |
| Example 7 | 88.13 |
| Example 8 | 87.52 |
| Comparative Example 1 | 39.54 |
| Comparative Example 2 | 28.57 |
| Comparative Example 3 | 38.37 |
| Comparative Example 4 | 80.2 |
| Comparative Example 5 | 70.95 |

Figure 3:
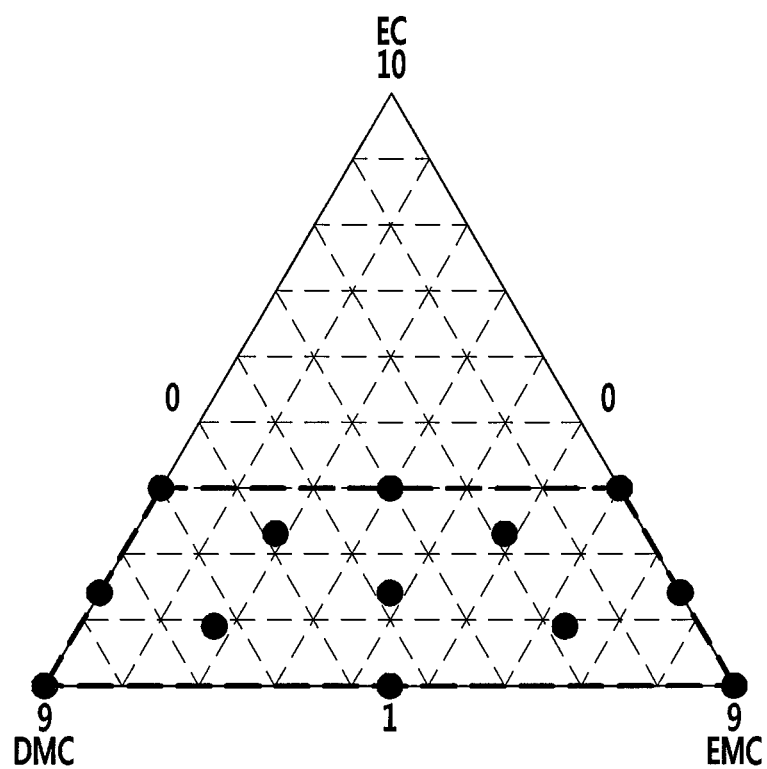
FIG. 3 is a graph showing solvent compositions of the electrolytes according to Electrolyte Examples 1 to 8 and Comparative Electrolyte Examples 1 to 5.

FIG. 3 is a graph showing solvent compositions of the electrolytes according to Electrolyte Examples 1 to 8 and Comparative Electrolyte Examples 1 to 5.

Figure 4:
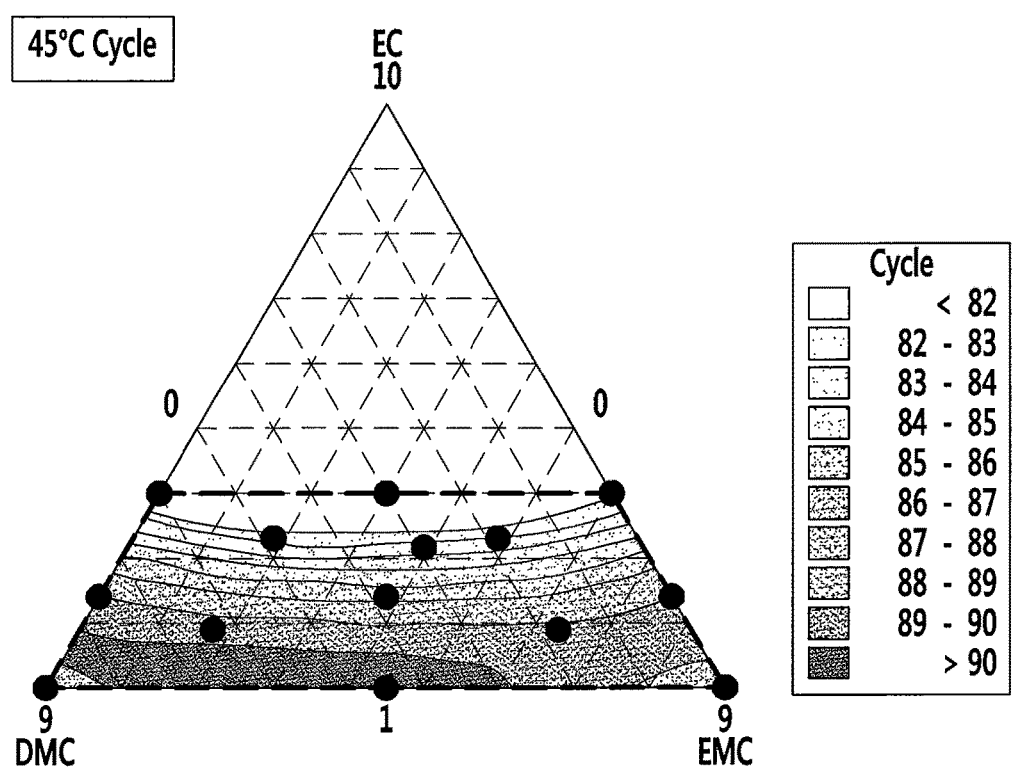
FIG. 4 is a contour plot mapping showing 45° C. cycle-life characteristics of the rechargeable lithium battery cells according to Examples 1 to 8 and Comparative Examples 1 to 5, including electrolytes each having solvent composition according to Electrolyte Examples 1 to 8 and Comparative Electrolyte Examples 1 to 5, respectively.

FIG. 4 is a contour plot mapping showing 45° C. cycle-life characteristics of the rechargeable lithium battery cells of Examples 1 to 8 and Comparative Examples 1 to 5, including the electrolytes according to Electrolyte Examples 1 to 8 and Comparative Electrolyte Examples 1 to 5, respectively.

Referring to FIGS. 3 and 4, the rechargeable lithium battery cells including the electrolytes having EC in an amount of less than or equal to 25 volume % according to Examples 1 to 8 showed improved high temperature cycle-life characteristics than the rechargeable lithium battery cells including the electrolytes having EC in an amount of greater than or equal to 30 volume % according to Comparative Examples 1 to 5.

For example, referring to FIG. 4, when EC was included in an amount of less than to or equal to 25 volume %, DMC in an amount of greater than or equal to 37.5 volume %, and EMC in an amount of less than or equal to 62.5 volume %, a high temperature cycle-life characteristic was particularly improved. Moreover, when EC:DMC:EMC had a composition of 30:40:30 volume %, 93.2% of initial capacity and 86.5% of 45° C. cycle capacity retention were obtained.

Figure 5:
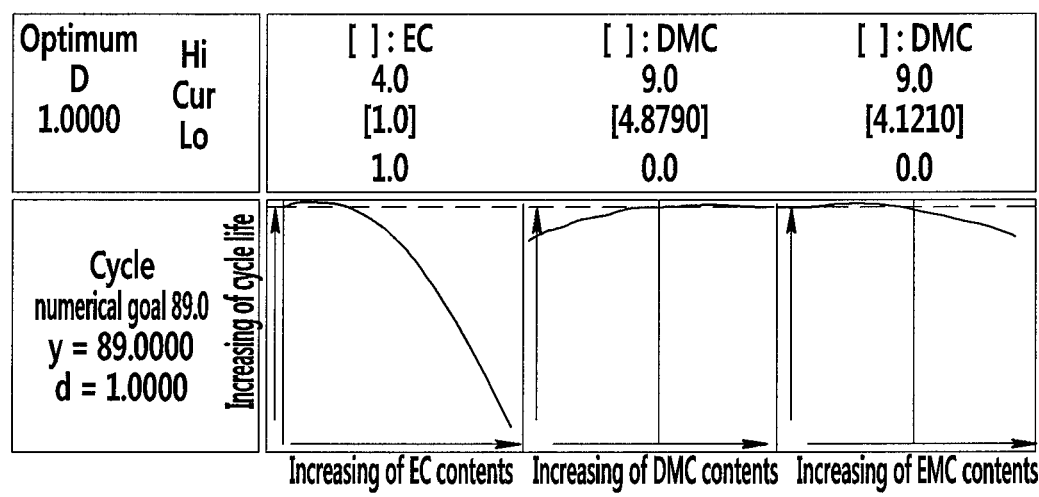
FIG. 5 is a graph showing a correlation between each solvent component included in the electrolytes according to Electrolyte Examples 1 to 8 and Comparative Electrolyte Examples 1 to 5 and cycle-life characteristics in the corresponding rechargeable lithium battery cells according to Examples 1 to 8 and Comparative Examples 1 to 5.

FIG. 5 is a graph showing a correlation between each solvent component included in the electrolytes according to Electrolyte Examples 1 to 8 and Comparative Electrolyte Examples 1 to 5 and cycle-life characteristics of the corresponding rechargeable lithium battery cells of Examples 1 to 8 and Comparative Examples 1 to 5 including the electrolytes.

Referring to FIG. 5, when EC was included in greater than or equal to a certain content, cycle-life was sharply deteriorated, and in addition, as DMC was more included, cycle-life characteristics were increased up to a certain content, but when the DMC was included in greater than or equal to that content, the cycle-life characteristics were saturated.

Likewise, as less EMC was included, cycle-life characteristics were increased, but when included in greater than or equal to a certain content, the cycle-life characteristics were saturated.

However, the cycle-life characteristics change was largely determined by the content of the EC, rather than the content of the DMC and EMC.

FIG. 5 also shows a correlation between 45° C. cycle-life characteristics and the content of the EC.

Figure 6:
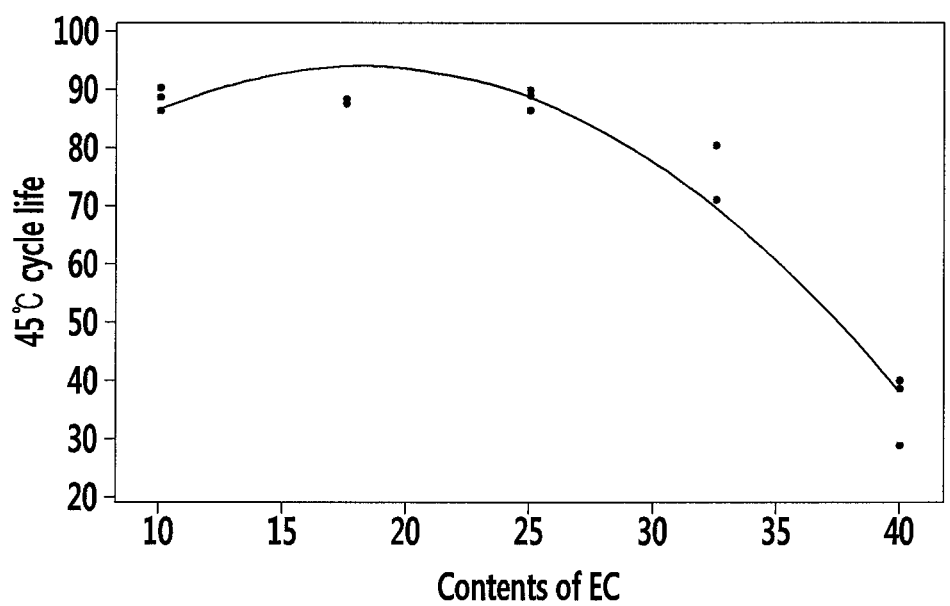
FIG. 6 is a graph showing a correlation between the EC content and 45° C. cycle-life characteristics in the rechargeable lithium battery cells according to Examples 1 to 8 and Comparative Examples 1 to 5.

FIG. 6 shows a graph showing a correlation between EC content and 45° C. cycle-life characteristics of Examples 1 to 8 and Comparative Examples 1 to 5.

Referring to FIG. 6, when the EC was included in greater than or equal to a certain content (here, 25 volume %), high temperature cycle-life characteristics were sharply deteriorated.

EXAMPLES 9 TO 18 AND COMPARATIVE EXAMPLES 7 AND 8

The rechargeable lithium battery cells according to Examples 9 to 18 and Comparative Examples 7 and 8 were evaluated regarding 45° C. cycle-life characteristics, and the results are provided in the following Table 6 and FIGS. 7 and 8.

TABLE 6

| | 45° C. cycle capacity retention (%) |
|---|---|
| Example 9 | 92.4 |
| Example 10 | 89.0 |
| Example 11 | 91.9 |
| Example 12 | 93.0 |
| Example 13 | 91.0 |
| Example 14 | 92.8 |
| Example 15 | 91.4 |
| Example 16 | 92.2 |
| Example 17 | 92.5 |
| Example 18 | 91.8 |
| Comparative Example 7 | 81.3 |
| Comparative Example 8 | 86.0 |

Figure 7:
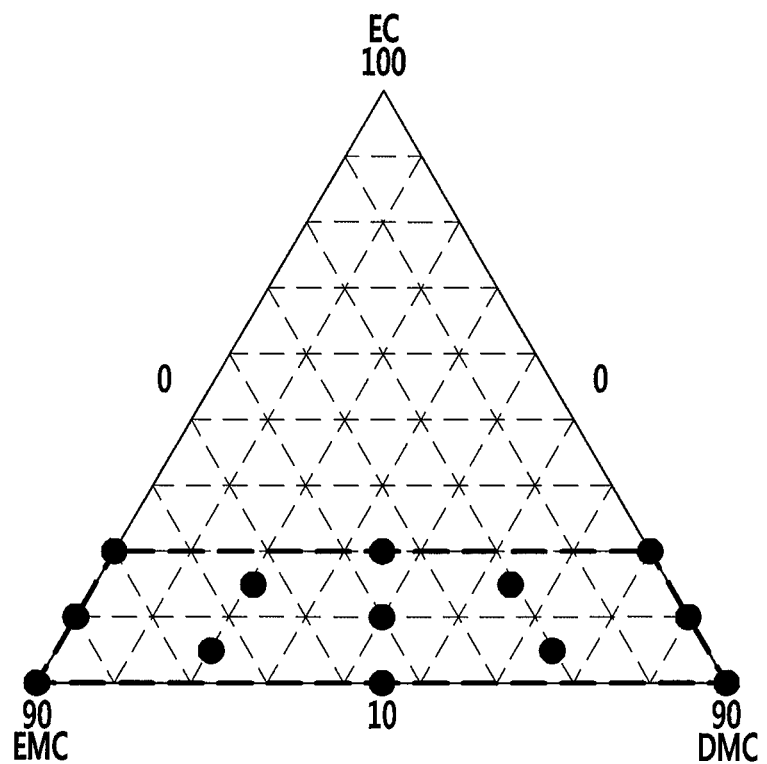
FIG. 7 is a graph showing electrolyte solution design with respect to solvent composition, according to some embodiments, of a rechargeable lithium battery including a positive active material having a NCM composition including 75% of Ni.

FIG. 7 is a graph showing an electrolyte solution design with respect to solvent composition in the rechargeable lithium battery cells including a positive active material having a NCM composition including 75% of Ni.

Figure 8:
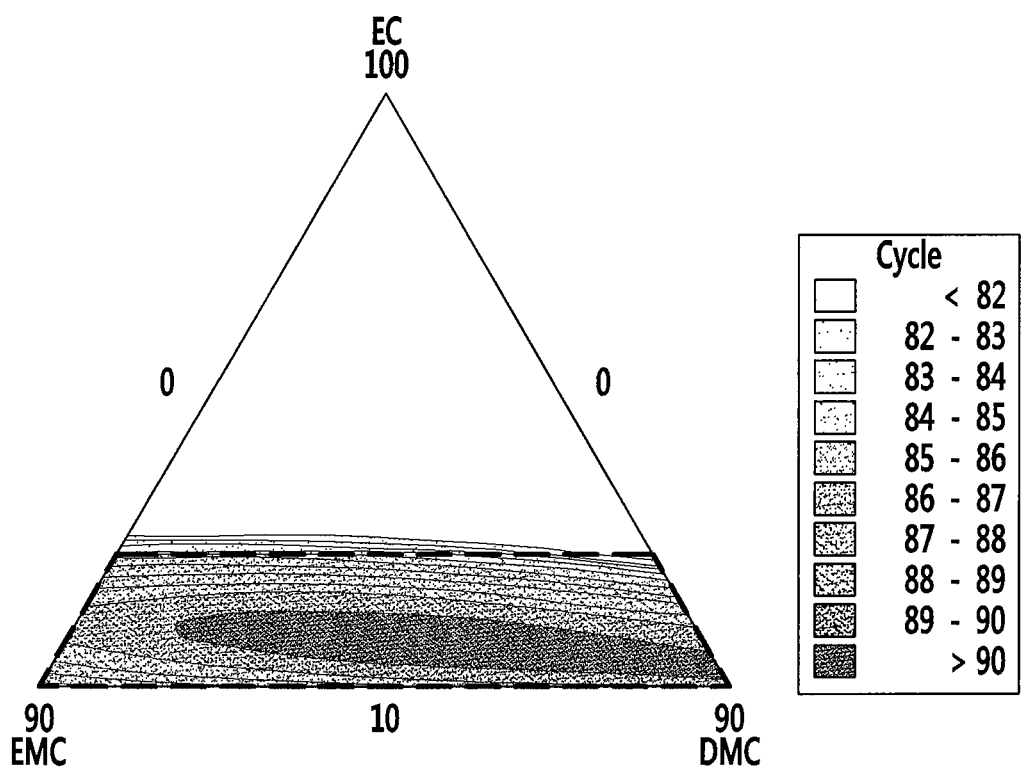
FIG. 8 is a contour plot mapping showing 45° C. cycle-life characteristics of the rechargeable lithium battery cells according to Examples 9 to 18 and Comparative Examples 7 and 8, depending on solvent composition of the electrolytes included therein, according to Electrolyte Examples 9 to 18 and Comparative Electrolyte Examples 7 and 8, respectively.

FIG. 8 is a contour plot mapping of 45° C. cycle-life characteristics depending on each solvent composition of the rechargeable lithium battery cells according to Examples 9 to 18 and Comparative Examples 7 and 8.

Referring to FIG. 8, the rechargeable lithium battery cells including an electrolyte having EC in an amount of less than or equal to 25 volume % according to Examples 9 to 18 showed improved high temperature cycle-life characteristics compared to the rechargeable lithium battery cells including an electrolyte having EC in an amount of greater than or equal to 30 volume % according to Comparative Examples 7 to 9.

Figure 9:
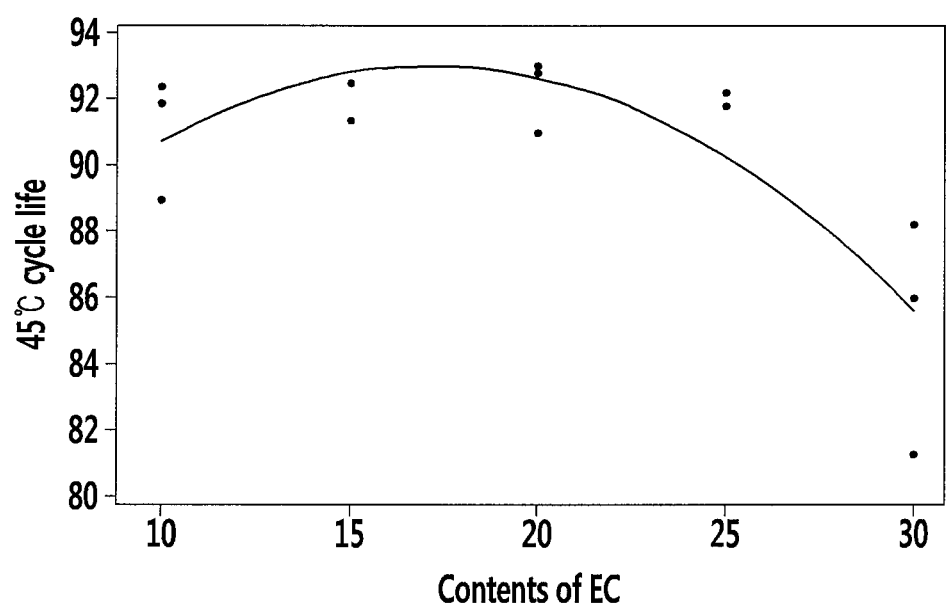
FIG. 9 is a graph showing a correlation between the EC content and 45° C. cycle-life characteristics of the rechargeable lithium battery cells according to Examples 9 to 18 and Comparative Examples 7 and 8.

FIG. 9 is a graph showing a correlation between EC content and 45° C. cycle-life characteristics in the rechargeable lithium battery cells of Examples 9 to 18 and Comparative Examples 7 to 9.

Referring to FIG. 9, when EC was included in an amount greater than or equal to a certain content (here, 25 volume %), high temperature cycle-life characteristics were sharply deteriorated.

COMPARATIVE EXAMPLES 10 TO 12

The rechargeable lithium battery cells according to Comparative Examples 11 to 13 were evaluated regarding 45° C. cycle-life characteristics, and the results are provided in the following Table 7 and FIG. 10.

TABLE 7

|  | 45° C. cycle capacity retention (%) |
| --- | --- |
| Comparative Example 10 | 83.5 |
| Comparative Example 11 | 79.0 |
| Comparative Example 12 | 84.0 |

Figure 10:
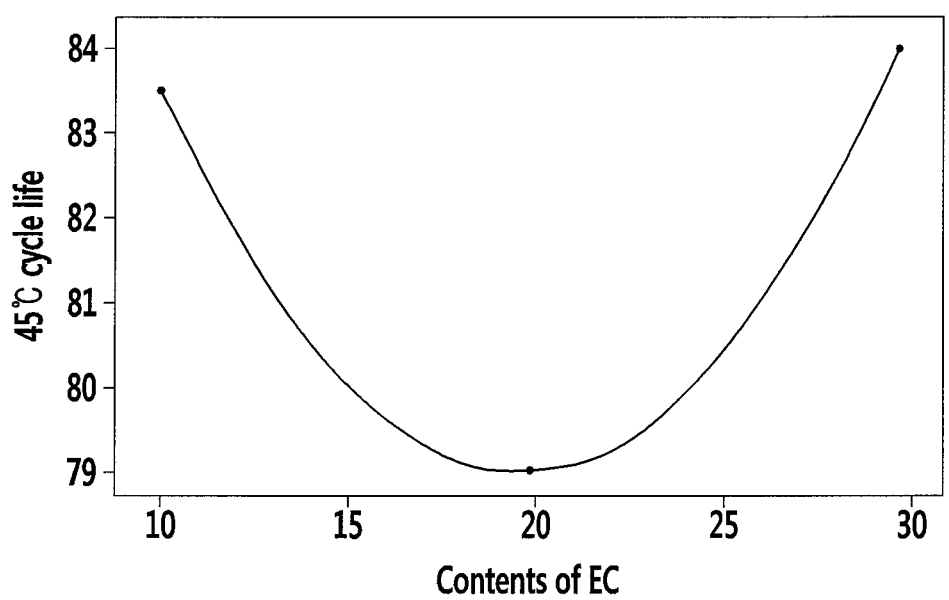
FIG. 10 is a graph showing a correlation between the EC content and 45° C. cycle-life characteristics of the rechargeable lithium battery cells according to Comparative Examples 10 to 12.

FIG. 10 is a graph showing a correlation between the EC content and 45° C. cycle-life characteristics in the rechargeable lithium battery cells of Comparative Examples 10 to 12.

Referring to FIG. 10, the EC content in Comparative Examples 10 to 12 (including Ni in an amount of 60%) had a different 45° C. cycle-life characteristics from 65% or 75% of Ni, and in particular, when the EC was included in an amount of 30 volume %, relatively good cycle-life characteristics were obtained, opposite to 65% or 75% of the Ni.

Evaluation 3: Gas Generation Amount after Allowed Standing at High Temperature

The rechargeable lithium battery cells according to Example 3 and Comparative Example 6 were charged at 4.2V, allowed to stand at 60° C. for 10 days, and an amount of gas generation was measured. The results are provided in the following Table 8.

TABLE 8

|  | Gas generation amount (ml) |
| --- | --- |
| Example 3 | 0.9 |
| Comparative Example 6 | 1.3 |

Referring to Table 8, the rechargeable lithium battery cell according to Comparative Example 6 showed a higher amount gas generation than that of the rechargeable lithium battery cell according to Example 3.

Evaluation 4: Output Maintenance Ratio

Prismatic large-sized cells depending on a positive electrode material according to Examples 3, 11 and 19 and Comparative Examples 6, 10, and 13 were adjusted about state of charge (SOC:) to 50% and discharged at 25° C. for 10 seconds with a current of 1C, 3C, and 5C and then, the voltage was measured when it reached 10 seconds. A difference between an initial voltage and a voltage at the 10 second time point, based on the currents was calculated and then, used to obtain DC internal resistance. The output based on the DC internal resistance is provided in the following Table 8.

An output maintenance ratio (%) was a percentage of capacity after a cycle based on initial capacity.

TABLE 9

| | Positive active material | 45° C. cycle number | 45° C. cycle capacity retention (%) | 45° C. cycle output maintenance ratio (%) | Vent |
| --- | --- | --- | --- | --- | --- |
| Example 3 | $LiNi_{75}Co_{10}Mn_{15}$ | 400 | 93.6 | 85.4 | Not open |
| Comparative Example 6 | | 327 | 83.2 | 69.1 | open |
| Example 11 | $LiNi_{65}Co_{20}Mn_{15}$ | 323 | 89 | 91.6 | Not open |
| Comparative Example 9 | | 229 | 80 | 84.2 | Not open |
| Example 19 | $LiNi_{85}Co_{10}Mn_5$ | 300 | 92.4 | 79.5 | Not open |
| Comparative Example 13 | | 170 | 97.8 | 49.8 | open |

Evaluation 2: 45° C. Cycle-Life characteristics Evaluation Depending on NCM Positive Active Material Composition FIG. 11 shows a correlation between 45° C. cycle-life characteristics of the rechargeable lithium battery cells according to Examples 1 to 18 and Comparative Examples 1 to 12 and the EC content for each NCM positive active material composition.

Figure 11:
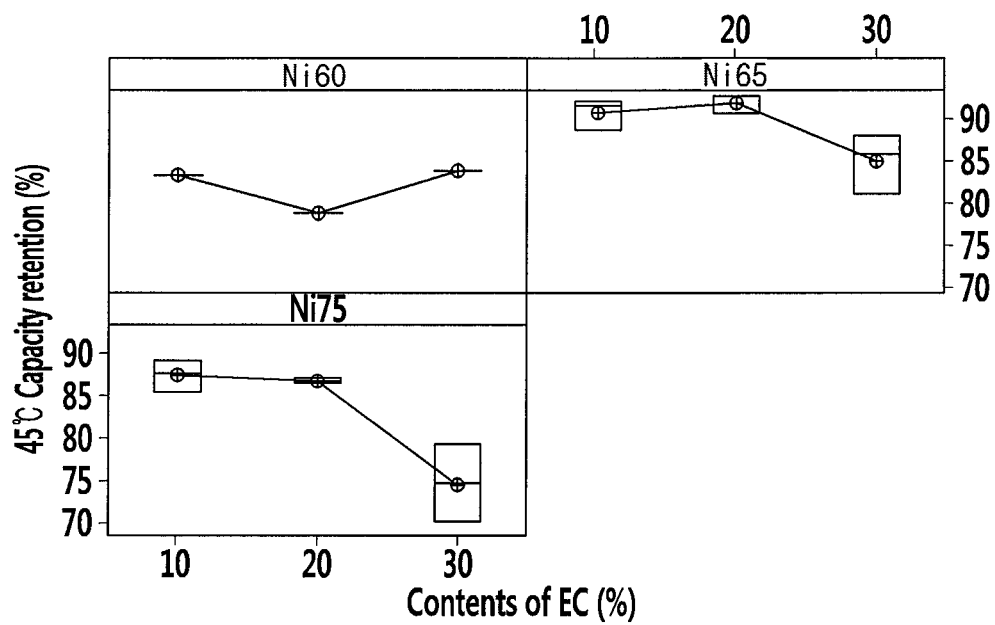
FIG. 11 is a graph showing a correlation between NCM composition and 45° C. cycle-life characteristics of the rechargeable lithium battery cells according to Examples 1 to 19 and Comparative Examples 1 to 12 depending on an EC content.

FIG. 11 also shows a correlation between NCM composition and 45° C. cycle-life characteristics depending on the EC content.

Referring to FIG. 11, when Ni was included in an amount of greater than or equal to 65% in a NCM positive active material composition, 45° C. cycle-life characteristics were sharply deteriorated with greater than or equal to 20% of EC.

Referring to Table 9, the rechargeable lithium battery cells according to Examples 3, 11 and 19 (including 10% EC) showed good cycle capacity retention, cycle output maintenance ratio and also, no open vent (NOT OPEN) and thus, less gas generation than the rechargeable lithium battery cells according to Comparative Example 6, 9, and 13. In other words, EC in an amount of less than or equal to 25 volume % showed an improved effect compared with EC in an amount of greater than or equal to 30%.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

100: rechargeable lithium battery
112: negative electrode
113: separator
114: positive electrode
120: battery case
140: sealing member
101: rechargeable battery
21: positive terminal
22: negative terminal
25: gasket
29: nut
30: cap plate
34: case
35: connecting plate
38: sealing cap
39: vent member
39a: notch

What is claimed is:

1. A rechargeable lithium battery comprising:
a positive electrode comprising a positive active material, the positive active material consisting of a nickel-cobalt-manganese (NCM) composite oxide, wherein the nickel-cobalt-manganese (NCM) composite oxide comprises nickel in an amount of greater than or equal to 65 atomic % and less than or equal to 75 atomic % based on a total amount of nickel, cobalt, and manganese in the nickel-cobalt-manganese (NCM) composite oxide; and
an electrolyte comprising a lithium salt and a non-aqueous organic solvent, wherein the non-aqueous organic solvent consists of ethylene carbonate in an amount of 10 volume % to 25 volume % based on a total amount of the non-aqueous organic solvent, dimethyl carbonate in an amount of equal to or less than 55 volume % based on a total amount of the non-aqueous organic solvent, and
a remainder consisting of ethylmethyl carbonate.

2. The rechargeable lithium battery according to claim 1, wherein the nickel-cobalt-manganese (NCM) composite oxide is represented by the following Chemical Formula 1, $$\text{LiNi}_x\text{Co}_y\text{Mn}_z\text{O}_2 \qquad \text{[Chemical Formula 1]};$$

wherein in Chemical Formula 1, $0.65 \leq x \leq 0.75$, $0.05 < y < 0.25$, $0.03 < z < 0.2$, and $x+y+z=1$.

3. The rechargeable lithium battery according to claim 2, wherein in Chemical Formula 1, x:y:z is 0.65:0.20:0.15.

4. The rechargeable lithium battery according to claim 2, wherein in Chemical Formula 1, x:y:z is 0.75:0.10:0.15.

5. The rechargeable lithium battery according to claim 1, wherein the nickel-cobalt-manganese (NCM) composite oxide is represented by the following Chemical Formula 1, $$\text{LiNi}_x\text{Co}_y\text{Mn}_z\text{O}_2 \qquad \text{[Chemical Formula 1]};$$

wherein $0.65 \leq x \leq 0.75$, $0.1 \leq y \leq 0.2$, $0.05 \leq z \leq 0.15$, and $x+y+z=1$.

6. The rechargeable lithium battery according to claim 1, wherein the nickel-cobalt-manganese (NCM) composite oxide has a specific capacity of 170 mAh/g or greater.

7. The rechargeable lithium battery according to claim 1, wherein the nickel-cobalt-manganese (NCM) composite oxide has a specific capacity of 180 mAh/g or greater.

8. The rechargeable lithium battery according to claim 1, wherein the nickel-cobalt-manganese (NCM) composite oxide has a specific capacity of 190 mAh/g or greater.

* * * * *